United States Patent
Rodriguez, Jr. et al.

(10) Patent No.: US 7,342,723 B2
(45) Date of Patent: *Mar. 11, 2008

(54) PROJECTION LENS AND PORTABLE DISPLAY DEVICE FOR GAMING AND OTHER APPLICATIONS

(75) Inventors: Ernesto M. Rodriguez, Jr., Austin, TX (US); Patricia M. Hughes, Round Rock, TX (US); Kai Chang Lu, Birmingham (GB)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/459,537

(22) Filed: Jul. 24, 2006

(65) Prior Publication Data

US 2007/0064207 A1 Mar. 22, 2007

Related U.S. Application Data

(63) Continuation-in-part of application No. 11/276,106, filed on Feb. 14, 2006, now Pat. No. 7,173,777, and a continuation-in-part of application No. 11/003,252, filed on Dec. 3, 2004, now Pat. No. 7,271,964.

(51) Int. Cl.
G02B 13/00 (2006.01)
G02B 9/00 (2006.01)
G02B 9/12 (2006.01)
G02B 13/18 (2006.01)
G02B 3/02 (2006.01)

(52) U.S. Cl. .................. 359/649; 359/784; 359/716

(58) Field of Classification Search ......... 359/689, 359/649, 749, 753, 754, 784, 651, 708, 716
See application file for complete search history.

(56) References Cited

U.S. PATENT DOCUMENTS 4,070,098 A 1/1978 Buchroeder (Continued)

FOREIGN PATENT DOCUMENTS

DE 29 20 360 A1 11/1980

(Continued)

OTHER PUBLICATIONS

Stupp, E.H., & Brennensholtz, M.S.; *Projection Displays*; John Wiley & Sons Ltd. (1999); pp. 146-150 and 205-208.

Primary Examiner—Alicia M Harrington
(74) Attorney, Agent, or Firm—Gregg H. Rosenblatt

(57) ABSTRACT

A portable projection device comprises a housing, a handle, and an optical engine. The optical engine comprises an illumination source, an imaging system, and a wide angle projection lens that includes a first lens group of negative refractive power, the first lens group having at least one aspheric surface, a second lens group, and a third lens group of positive refractive power. For the wide angle projection lens, the following Conditions (1) to (4) are satisfied: $|F_1/F| \geq 4.5$ (Condition (1)); $2.5 \leq |F_2/F| \leq 6.0$ (Condition (2)); $3.8 \leq |F_3/F| \leq 5.0$ (Condition (3)); and $0.8 \leq BFL/F \leq 1.4$ (Condition (4)). The portable projection device can be implemented as a personal gaming system and can also be configured as a portable, fully integrated video gaming system that allows gamers to plug in and play at nearly any location, with only a wall or other viewing surface being used to view the projected image.

21 Claims, 5 Drawing Sheets

U.S. PATENT DOCUMENTS

| | | | |
|---|---|---|---|
| 4,256,373 A | 3/1981 | Horimoto | |
| 4,685,774 A | 8/1987 | Moskovich | |
| 4,908,705 A | 3/1990 | Wight | |
| 4,976,429 A * | 12/1990 | Nagel | 353/122 |
| 5,363,242 A | 11/1994 | Yokota et al. | |
| 5,390,048 A | 2/1995 | Miyatake et al. | |
| 5,442,484 A | 8/1995 | Shikawa | |
| 5,510,862 A | 4/1996 | Lieberman et al. | |
| 5,526,186 A | 6/1996 | Sekine | |
| 5,606,459 A | 2/1997 | Nakatsuji | |
| 5,625,495 A | 4/1997 | Moskovich | |
| 5,664,859 A | 9/1997 | Salerno et al. | |
| 5,870,228 A | 2/1999 | Kreitzer et al. | |
| 5,900,987 A | 5/1999 | Kreitzer | |
| 5,969,876 A | 10/1999 | Kreitzer et al. | |
| 5,973,848 A | 10/1999 | Taguchi et al. | |
| 5,978,150 A | 11/1999 | Hamanishi et al. | |
| 6,109,767 A | 8/2000 | Rodriguez | |
| 6,137,638 A | 10/2000 | Yamagishi et al. | |
| 6,179,426 B1 | 1/2001 | Rodriguez, Jr. et al. | |
| 6,224,216 B1 | 5/2001 | Parker et al. | |
| 6,439,726 B1 | 8/2002 | Piehler | |
| 6,476,981 B1 | 11/2002 | Shikama | |
| 6,522,419 B1 | 2/2003 | Ko | |
| 6,542,316 B2 | 4/2003 | Yoneyama | |
| 6,578,999 B2 | 6/2003 | Schmidt et al. | |
| 6,580,469 B1 | 6/2003 | Rieche et al. | |
| 6,626,543 B2 | 9/2003 | Derryberry | |
| 6,896,375 B2 | 5/2005 | Peterson et al. | |
| 6,912,095 B2 | 6/2005 | Yamada | |
| 6,962,417 B1 | 11/2005 | Teng et al. | |
| 6,966,651 B2 | 11/2005 | Johnson | |
| 2002/0057505 A1 | 5/2002 | Sato | |
| 2002/0060859 A1 | 5/2002 | Yoneyama | |
| 2004/0233394 A1 | 11/2004 | Gohman | |
| 2005/0122484 A1 | 6/2005 | Rodriguez, Jr. et al. | |
| 2005/0122599 A1 | 6/2005 | Lu | |
| 2005/0135095 A1 | 6/2005 | Geissler | |
| 2005/0157402 A1 | 7/2005 | Rodriguez, Jr. et al. | |
| 2005/0237629 A1 | 10/2005 | Lu et al. | |
| 2007/0201005 A1* | 8/2007 | Rhodes et al. | 353/30 |

FOREIGN PATENT DOCUMENTS

| | | |
|---|---|---|
| DE | 103 07 740 A1 | 9/2004 |
| JP | 62-201737 U | 12/1987 |
| JP | 02-027390 U | 2/1990 |
| JP | 02-196230 A | 8/1990 |
| JP | 02-230288 A | 9/1990 |
| JP | 03-027085 A | 2/1991 |
| JP | 03-056951 A | 3/1991 |
| JP | 07-151971 | 6/1995 |
| JP | 10-206969 | 8/1998 |
| JP | 2004-245893 | 9/2004 |
| WO | WO 97/16927 | 11/1980 |
| WO | WO 00/67059 | 11/2000 |
| WO | WO 2004/109365 A1 | 12/2004 |

* cited by examiner

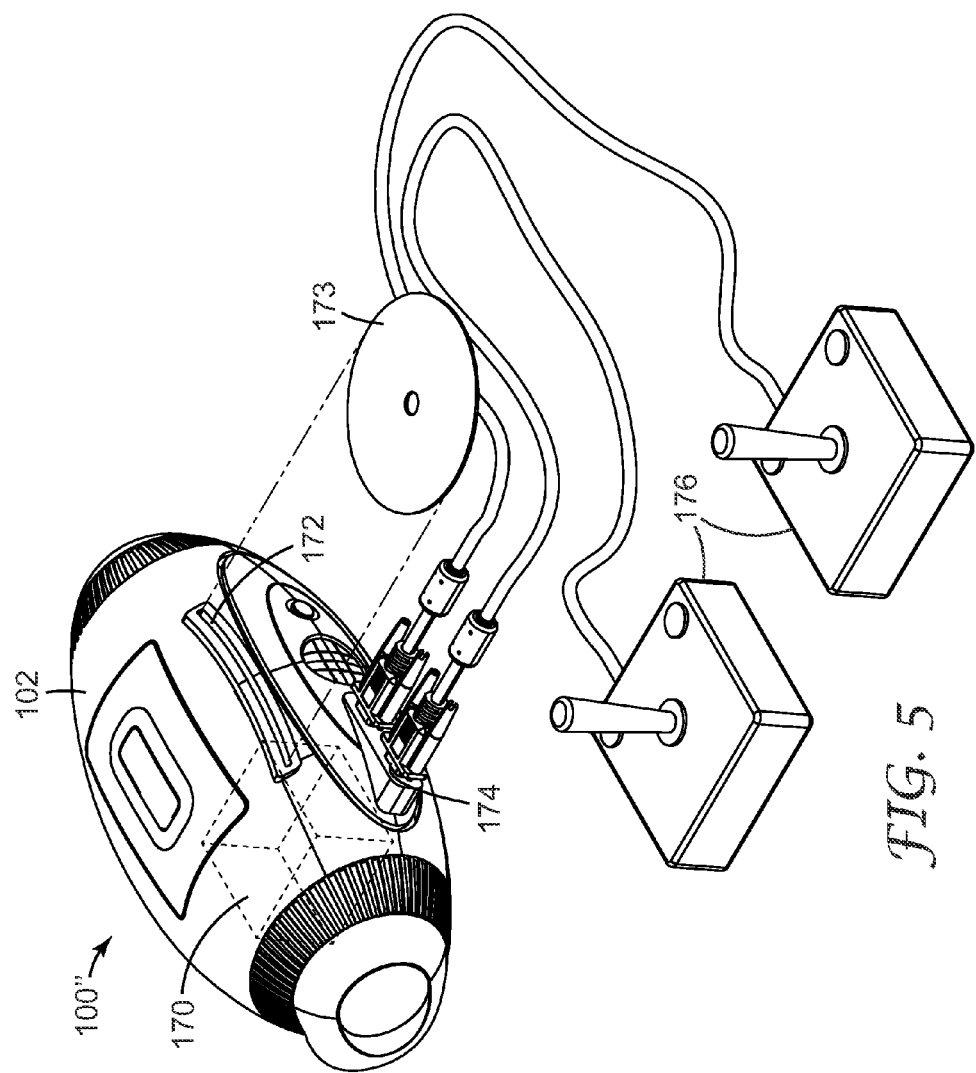

PROJECTION LENS AND PORTABLE DISPLAY DEVICE FOR GAMING AND OTHER APPLICATIONS

RELATED APPLICATIONS

The present application is a continuation-in-part of U.S. patent application Ser. Nos. 11/276,106, filed on Feb. 14, 2006 now U.S. Pat. No. 7,173,777, and Ser. No. 11/003,252, filed on Dec. 3, 2004 now U.S. Pat. No. 7,271,964, the disclosures of which are each incorporated by reference in their entirety.

FIELD OF INVENTION

The present invention relates to a projection lens for use in a short throw distance portable display system for gaming and other applications.

BACKGROUND

Electronic or video display systems are devices capable of presenting video or electronically generated images. Whether used in home entertainment, advertising, videoconferences or group conferences, the demand exists for an appropriate display device.

Image quality is one of the factors consumers use to determine the appropriate display device. In general, image quality can be determined qualitatively by factors such as image resolution and image color. As the desire by some consumers is for display devices having larger picture size, image quality can suffer. Typically, a large picture size is one that exceeds about 40 inch screen size as measured along the diagonal of the screen.

While many display devices are available on the market today in front projection systems, there is a continuing need to develop other devices.

SUMMARY

An embodiment of the present invention, a portable projection device, comprises a housing, a handle, and an optical engine. The optical engine comprises an illumination source, an imaging system, and a wide angle projection lens that includes, in sequential order from an output side, a first lens group of negative refractive power, the first lens group having at least one aspheric surface, a second lens group, and a third lens group of positive refractive power. For the wide angle projection lens, the following Conditions (1) to (4) are satisfied:

| | |
|---|---|
| $\|F_1/F\| \geq 4.5$ | Condition (1) |
| $2.5 \leq \|F_2/F\| \leq 6.0$ | Condition (2) |
| $3.8 \leq \|F_3/F\| \leq 5.0$ | Condition (3) |
| $0.8 \leq BFL/F \leq 1.4$ | Condition (4) |

Here, F is the focal length of the wide-angle projection lens, $F_1$ is the focal length of the first lens group, $F_2$ is the focal length of the second lens group, $F_3$ is the focal length of the third lens group, and BFL is the back focal length.

In one exemplary aspect, the effective focal length to image height ratio is about 0.5 to 1.0.

In another exemplary embodiment, the third lens group comprises an aperture stop for the wide-angle projection lens, a first lens element and a second lens element, where the second lens element has an effective focal length of from about 30 mm to about 40 mm. Further, the second lens element can comprise a surface facing the aperture stop and a surface facing away from the aperture stop, where the curvature of the surface facing the aperture stop is greater than the curvature of the surface facing away from the aperture stop. The second lens element can be a single structure lens element, such as a bi-convex lens or a plano-convex lens.

In one exemplary aspect, the handle is an adjustable handle that can, for example, provide the user the ability to change the tilt of the projector. In another exemplary aspect, the portable projection device includes several inputs/outputs for receiving/outputting digital image and sound signals. In addition, the portable projection device can include a control panel on the housing to adjust image and sound parameters. The control panel can also be accessed through a remote control device. The portable projection device can project a received digital image on a screen, wall, or other viewing surface. Also, the portable projection device can further include one or more speakers housed therein for outputting sound.

In one exemplary embodiment, the portable projection device further includes a docking port configured to receive a handheld digital image/sound player, such as an MPEG player. A user can insert his or her handheld digital image/sound player in the docking port and display a video image on a screen, wall, or other viewing surface.

In another exemplary embodiment, the portable projection device is configured as a portable gaming device and projector, where a video gaming system is housed in the portable projector housing. The housing can further include a gaming card/disc/cartridge receptacle coupled to the gaming system. One or more input ports for joysticks or other gaming user interface devices are also included. The portable gaming device and projector projects the video game image on a screen, wall, or other viewing surface.

In another embodiment of the present invention, a portable projection device, comprises a housing, a handle, and an optical engine. The optical engine comprises an illumination source, an imaging system, and a wide angle projection lens that includes, in sequential order from an output side, a first lens group of negative refractive power, the first lens group having at least one aspheric surface, a second lens group, and a third lens group of positive refractive power. For the wide angle projection lens, the following Conditions (1) to (4) are satisfied:

| | |
|---|---|
| $1.3 \leq \|F_1/F\| \leq 2.0$ | Condition (1) |
| $\|F_2/F\| \geq 4.0$ | Condition (2) |
| $3.8 \leq \|F_3/F\| \leq 5.0$ | Condition (3) |
| $0.8 \leq BFL/F \leq 1.4$ | Condition (4) |

In an exemplary aspect, the effective focal length to image height ratio is about 0.5 to 1.0. In another exemplary embodiment, the third lens group comprises an aperture stop for the wide-angle projection lens, a first lens element and a second lens element, where the second lens element has an effective focal length of from about 30 mm to about 40 mm. The second lens element can comprise a surface facing the aperture stop and a surface facing away from the aperture stop, where the curvature of the surface facing the aperture stop is greater than the curvature of the surface facing away from the aperture stop.

In another aspect of the present invention, the optical engine of the portable projection device comprises an illumination system, an imaging system, and a projection lens having a back focal length of less than about 1.4 times the effective focal length and a speed of less than or equal to about F/3.1 or less. The projection lens generates an image at a half field angle of at least about 50° that has substantially no distortion.

The optical system of the portable projection device is a short throw distance, extreme off-axis, projection system. The term "throw distance" means the distance defined by the normal from the projection screen to the projection lens. The phrase "short throw distance" means a distance of less than one meter. The term "extreme off-axis" means the projected image subtends an angle of greater than 45 degrees. In addition, the projection device projects an image having substantially no distortion. By substantially no distortion, it is meant that the distortion is no greater than 2%. In preferred aspects, the distortion is less than or equal to 1%, most preferably less than or equal to 0.5%. At these distortion values, for at least most imaging applications, no electronic distortion correction is required. The phrase "substantially zero refractive power" means less than 3% of the total lens power of all of the lens groups. The terms "4×3 format" and "16×9 format" refer to conventional image formats as measured by the image width versus the image height. In this document, the term "about" is presumed to modify all numerical values.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

FIG. 5 shows an alternative aspect of a portable gaming and projection device utilizing an exemplary optical engine.

Figure 1:
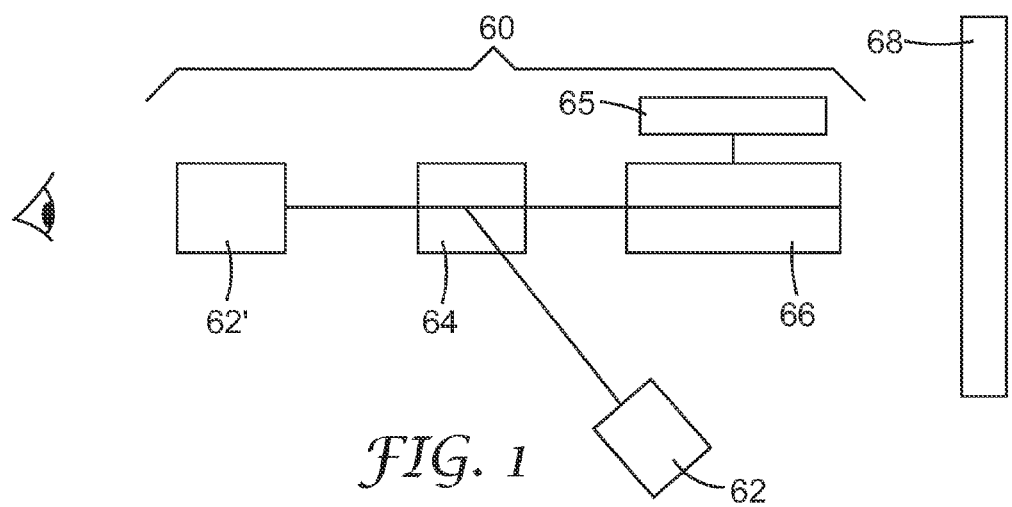
FIG. 1 is a schematic representation of an exemplary optical engine that can be used in the present invention.

These figures are not drawn to scale and are intended only for illustrative purposes. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

The present invention relates to a portable projection system having an optical engine that includes a wide angle projection lens producing an image at a short throw distance. In an exemplary implementation, the portable projection system can be adapted for projecting an extreme off-axis image, such as from a video game or other entertainment system. In another exemplary implementation, the projection system is configured as a completely portable gaming device and projector, where a video gaming system is integrated with the projector in a portable system.

Figure 2A:
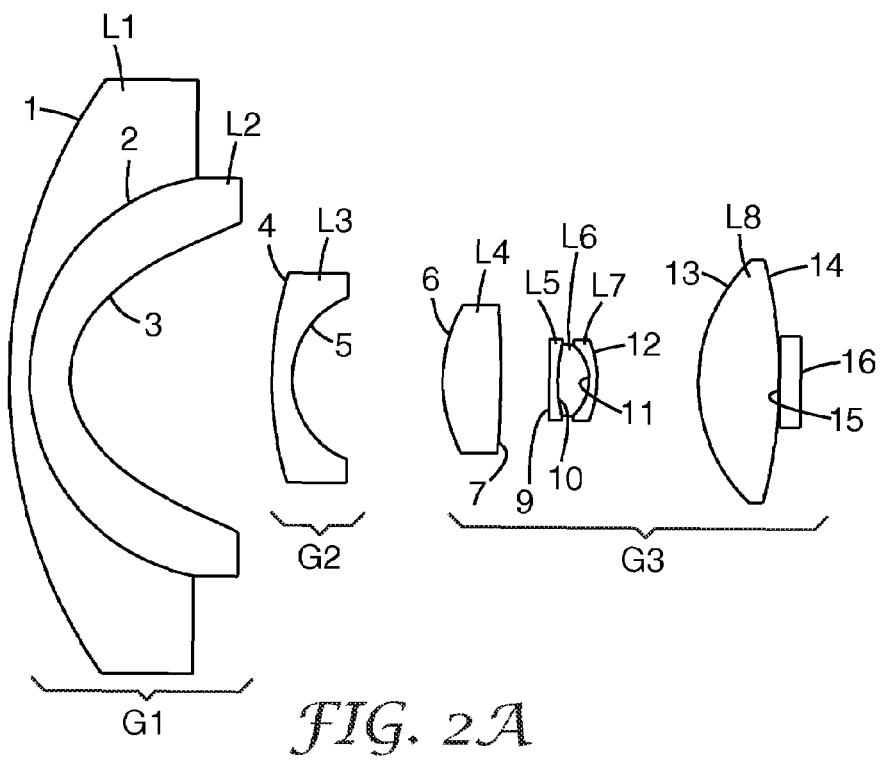
FIG. 2 is a schematic representation of an exemplary projection optics that can be used in the present invention.
Figure 2B:
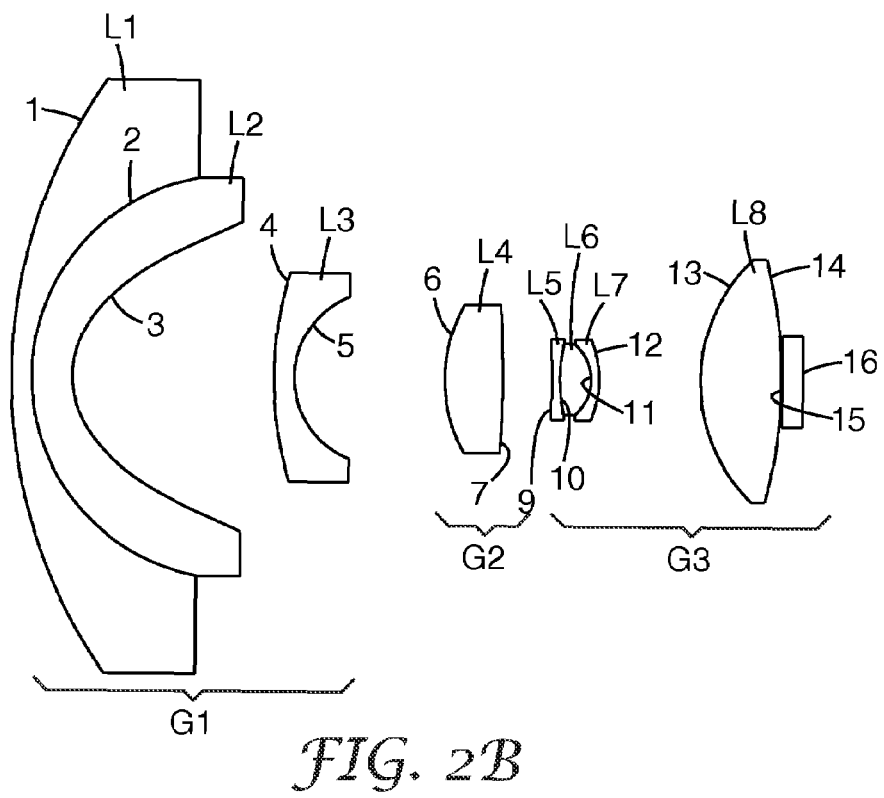
Figure 3A:
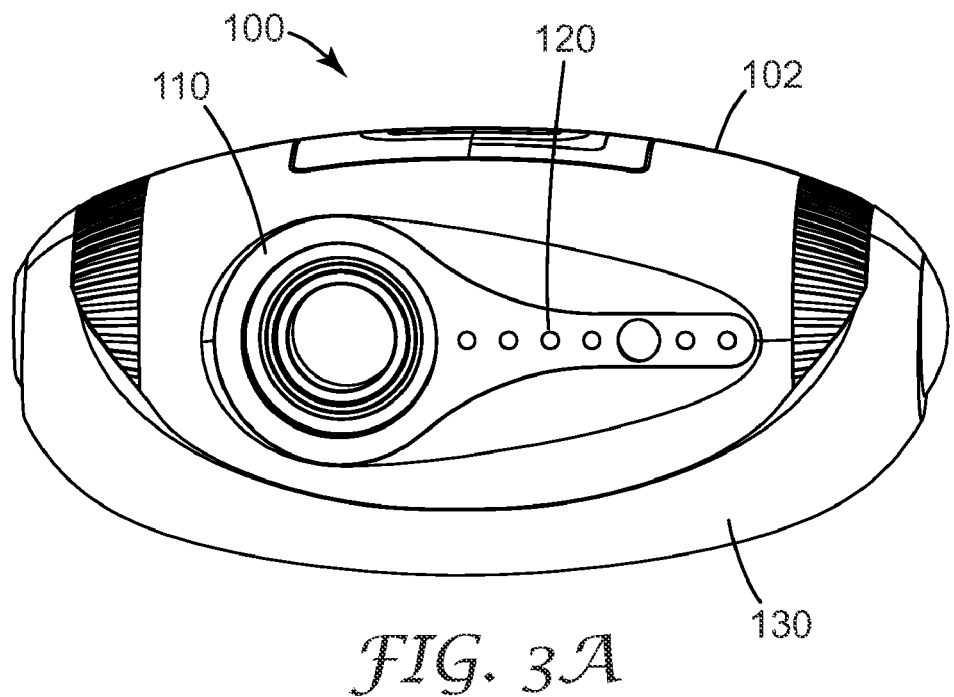
FIGS. 3A-3C show different views of a portable projection device utilizing the exemplary optical engine.
Figure 3B:
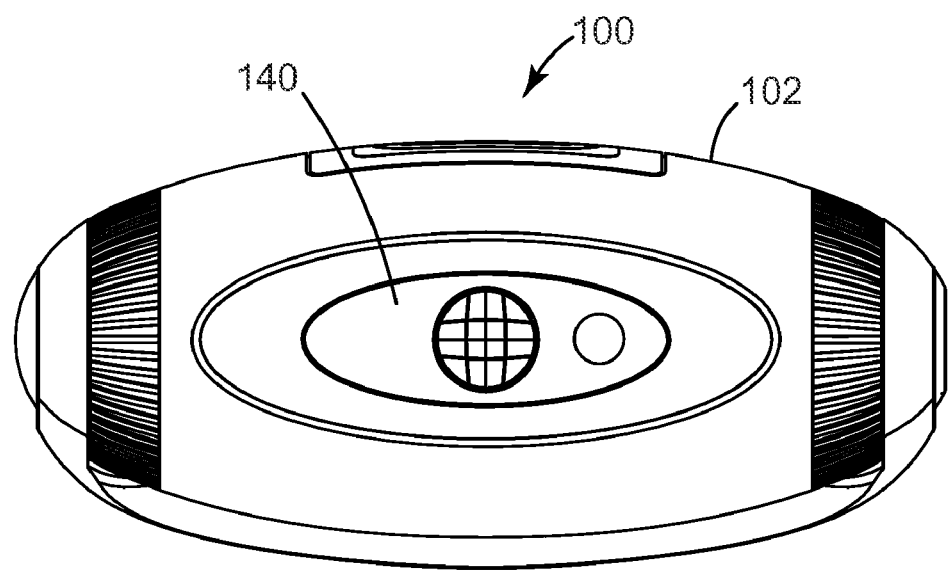
Figure 3C:
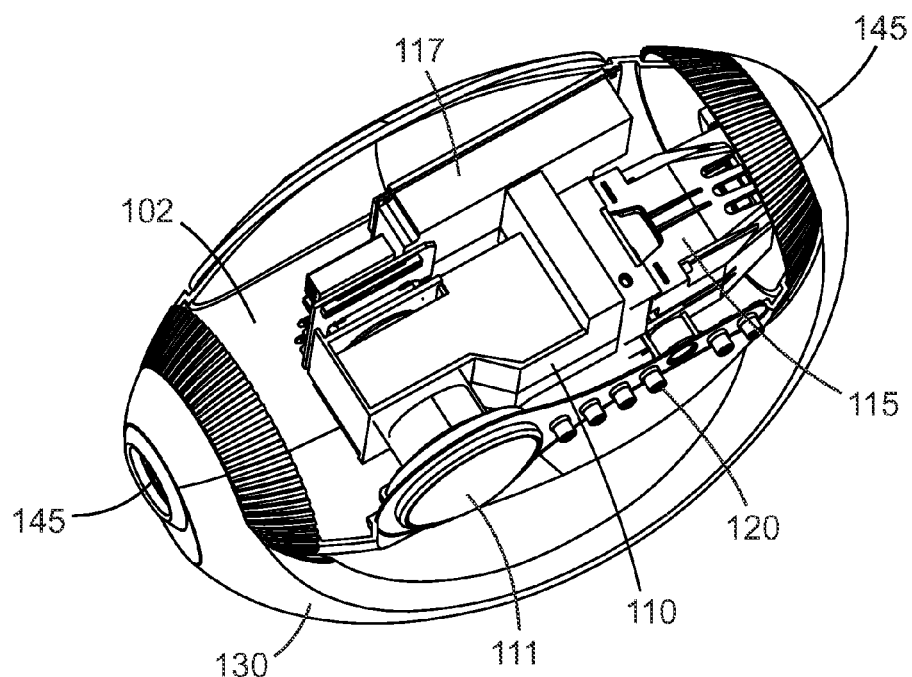

FIGS. 3A-3C show different views of a portable projection system 100 according to an exemplary embodiment of the present invention. The portable projection device can project a received digital image (e.g., 4×3 format image or a 16×9 format image) on a screen, wall, or other viewing surface. As shown in a front view in FIG. 3A, portable projection system 100 includes a housing 102. Preferably, housing 102 is constructed from a lightweight, yet rugged material, such as a thermoplastic resin (e.g., polycarbonate). An optical engine 110 that includes an illumination source, an imaging system, and a wide angle projection lens 111 is disposed in projector housing 102. Embodiments of the optical engine and wide angle projection lens are described in greater detail below with respect to FIGS. 1, 2A and 2B. A protective lens cap (not shown) can be provided to cover the outer surface of the wide angle projection lens when the projection system is not in use.

Portable projection system 100 also includes a plurality of input/output ports or jacks 120 which can be used to couple a sound/video image source, such as emanating from a video player (e.g., DVD player, VCR, MPEG player, gaming system, or computer), to the portable projection system 100. The input/output ports or jacks 120 can be configured to receive standard electronics connectors (RCA plugs, s-video, HDMI, etc.). Portable projection system 100 also includes a handle 130. In an exemplary aspect, handle 130 is an adjustable handle, for example, that provides pivoting capability about both ends of the housing. For example, handle 130 can provide for easy carrying of the projector and can also provide an adjustable support structure for the projector when in operation. The adjustability of the handle can provide the user the ability to tilt the projection system at a proper angle. As shown in FIG. 3B in a rear view, portable projection system 100 further includes a control panel 140 which provides a user with access to a control menu and to adjust parameters of the projected image, such as image size, image distance, image tilt. In an exemplary aspect, the control panel 140 can be accessed both manually and through the use of a remote control device (not shown).

In more detail, FIG. 3C shows a front, isometric view of the portable projection system 100. As shown, housing 102 contains optical engine 110, illumination source 115, and ballast 117. In addition, housing 102 can further contain speakers 145. In this exemplary embodiment, speakers 145 are positioned at each end. Alternatively, speakers 145 can be disposed in other locations of housing 102. Also, the housing can include audio output jacks in addition to, or in place of, speakers 145, in order to output sound on external speakers (not shown). In addition, cooling components, a power supply and/or further control electronics can be disposed in projector housing 102. A power cord input (not shown) can also be provided.

Figure 4:
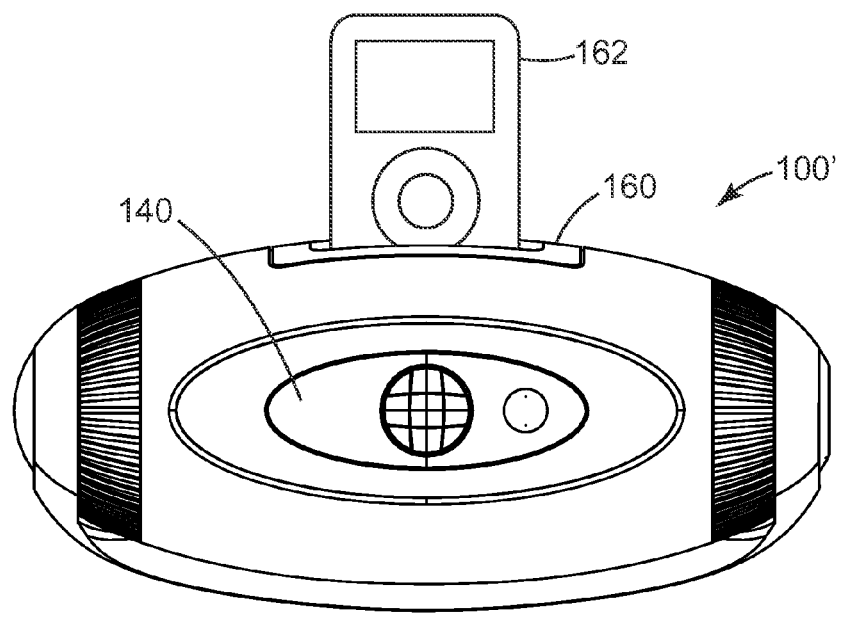
FIG. 4 shows an alternative aspect of a portable projection device utilizing an exemplary optical engine.

In an alternative embodiment, as shown in FIG. 4, portable projection system 100' can include a docking port 160 configured to receive a handheld digital image/sound player 162, such as an MPEG player. A user can insert his or her handheld digital image/sound player in the docking port and display a video image on a screen, wall, or other viewing surface.

In a further alternative embodiment, as shown in FIG. 5, portable projection system 100" is configured as a portable gaming device and projector, where a video gaming system 170 is housed in the portable projector housing 102. The video gaming system can be, for example, a specially configured version of X-BOX, GAMECUBE, PLAYSTATION, or other commercially available gaming system. The housing can further include a gaming card/disc/cartridge receptacle 172 coupled to the gaming system 170 that receives a game disc or card or cartridge 173 (depending on the format of the particular gaming system). One or more input ports 174 for joysticks 176 or other gaming user interface devices are also included. This exemplary embodiment is a portable, fully integrated video gaming system that allows gamers to plug in and play at nearly any location, with only a wall or other viewing surface being used to view the projected image.

In the embodiments described above, the portable projection system can operate as a personal gaming system that can provide a projected image of a video game with multiple players without the need for a television, monitor, or other specific display device. As described in more detail below, the optical engine can provide a large image size with a high quality and at a short throw distance.

In preferred aspects, the portable projection system 100, 100', 100" includes an optical engine, such as described below with respect to FIGS. 1, 2A and 2B. Alternatively, the portable projection system 100" can include an optical engine with an alternative projection lens such as described in pending U.S. Publication Nos. 2005/0157402-A1 and 2005/0122484-A1, incorporated by reference herein in their entirety.

As mentioned above, the portable projection system of exemplary embodiments of the present invention include an optical engine capable of projecting a quality image of large size (greater than e.g., 30 inches diagonal) at a short throw distance (about 1 meter or less). FIG. 1 shows a schematic representation of an exemplary optical engine 60 having one or more of the following components: illumination system 62 or 62', imaging system 64, a focus mechanism 65, and projection optics 66. While two different illumination systems 62 and 62' are shown, typically only one is used. When the illumination system lies in position depicted by reference number 62, the imager used is a reflective imager. In contrast, when the illumination system lies in position depicted by reference number 62', the imager used is a transmissive imager. The optical engine can generate an image on a projection screen or a viewing surface 68. Each element in the optical engine is discussed in detail below.

The illumination system 62, 62' can include a lamp unit, a filter (such as an infrared light and/or an ultraviolet light rejection filter), a color separation means, and an integrator. In one exemplary embodiment, the lamp unit includes a reflector and a lamp. Suitable, commercially available lamps include (i) Philips UHP type lamp unit, which uses an elliptic reflector, from Philips Semiconductors, Eindhoven, The Netherlands and (ii) OSRAM P-VIP 250 lamp unit from OSRAM GmBH, Munich, Germany. Other suitable lamps and lamp unit arrangements can be used in the present invention. For example, metal halide lamps, tungsten halogen lamps or solid state sources, such as light emitting diodes (LED's) or lasers can be used. In one example, for a lower cost unit, a lower power (e.g., 50 Watt-100 Watt), high pressure Hg lamp (commercially available from companies such as Osram and Philips) can be utilized. In an alternative implementation an LED solid state light source, available from such companies as Osram and Lumileds, can be utilized.

The type of filter, color wheel, and integrator that can be used in embodiments of the present invention are not critical. In one exemplary embodiment, the color separation means is a spinning red/green/blue (RGBRGB) or red/green/blue/white (RGBW) color sequential disc in the light source of the imager. An illustrative commercially available color wheel is the UNAXIS RGBW color wheel, from UNAXIS Balzers, LTD, Balzers, Liechtenstein. Alternatively, a 44 mm RGBW color wheel (with 40 degree WS) can be utilized. A liquid crystal RGB color sequential shutter can also be used in embodiments of the present invention. An illustrative commercially available integrator is a hollow tunnel type integrator from UNAXIS Balzers LTD.

The imaging system 64 can include an imager and typically can also include conventional electronics. A useful reflective imager that can be used in the present invention is a XGA digital micromirror device (DMD) having a diagonal dimension of about 22 mm, available from Texas Instruments, Dallas, Tex. For a lower cost projector, a 480 p or SVGA-type DLP device available from Texas Instruments, Dallas, Tex., can be utilized. Alternatively, a transmissive or reflective liquid crystal display (LCD) or liquid crystal on silicon (LCOS) can be used as the imager. In exemplary optical engine embodiments, the surface of the imager is positioned substantially parallel to the surface of the projection screen.

For some implementations, a focusing mechanism 65 can be accomplished by mounting one or more of the lenses described below on a slidable or threaded mount (not shown), which can be adjusted manually by hand or through the use of an electronic actuation mechanism. For example, focusing can be accomplished by using a varifocal or a zoom lens.

In most implementations, the generated image can be viewed on any surface, e.g., a wall or other structure, or standard viewing screen. In some implementations, a special screen 68 may comprise a multi-layer material, for example, a plurality of Fresnel elements configured as is described in U.S. Pat. No. 6,179,426.

FIGS. 2A and 2B show two exemplary embodiments of projections optics (also referred to herein as a "projection lens" or a "wide-angle projection lens") of the optical engine 60. The projection optics of FIGS. 2A and 2B include three lens groups (as identified from an output side or screen side): first lens group (G1), second lens group (G2), and third lens group (G3). The term "output side" means that side of the projection lens closest to a viewing surface. The three lens groups are discussed in detail below. As would be apparent to one of ordinary skill in the art given the present description herein, alternative constructions of projection lens 66 can be employed, including alternative constructions that include fewer, the same, or greater numbers of lens elements.

In a first embodiment, the exemplary projection lens of FIG. 2A includes a total of eight (8) elements in the three lens groups, numbered from the output side. In this description, F is the total focal length of the projection lens, $F_1$ is the focal length of the first lens group, $F_2$ is the focal length of the second lens group, and $F_3$ is the focal length of the third lens group.

The first lens group (G1) can include, in order from the screen side, a first lens element (L1) of negative refractive power and a second lens element (L2) having an aspheric surface on its second surface. Preferably, G1 is of negative refractive power. The ratio of $F_1/F$ in G1 can be such that $|F_1/F| \geq 4.5$. In one exemplary embodiment, $|F_1/F|$ is about 5.1. In a preferred aspect, the lenses comprising G1 can have a substantially circular shape. Alternatively, the lenses comprising G1 can have a more oblong or oval lens shape with a rectangular aperture, a rectangular lens shape with a rectangular aperture, or a circular lens shape with a rectangular aperture.

The second lens group (G2) can include one lens element, (L3). In this embodiment, G2 is of negative refractive power.

The ratio of $F_2/F$ in G2 can be such that $2.5 \leq |F_2/F| \leq 6$. In one exemplary embodiment, $|F_2/F|$ is about 4.2.

In this exemplary embodiment, the aperture stop lies within the third lens group (G3). The third lens group (G3) can include multiple lens elements, e.g., (L4) to (L8) inclusive. Preferably, G3 is of positive refractive power. The ratio of $F_3/F$ in G3 can be such that $3.8 \leq F_3/F \leq 5.0$. In one exemplary embodiment, $|F_3/F|$ is about 4.6. In this exemplary embodiment, L8, the lens closest to the illumination input can be considered as a "field lens."

In a preferred aspect, L8 can be a single structure lens, such as a bi convex or plano-convex lens, having an effective focal length of from about 30 mm to about 40 mm. In an alternative aspect, L8 can have a focal length shorter than 30 mm if using a high index material, such as LaK34 glass to form L8.

In a preferred aspect, the first surface of lens element L8 can have a radius of curvature of about 25 mm. In addition, L8 can be substantially removed from the aperture stop of the projection lens. In another aspect, the curvature of the surface of L8 facing the aperture stop (e.g., surface 13) is greater than the curvature of the surface (e.g., surface 14) facing away from the aperture stop. In another aspect, the distance between L8 and L7 is from about 12 mm to about 17 mm. This spacing provides for a folding mirror to be placed in the optical engine as part of the illumination system.

In a second embodiment, the exemplary projection lens of FIG. 2B includes a total of eight (8) elements in the three lens groups, numbered from the output side. The first lens group (G1) can include a first lens element (L1) of negative refractive power, a second lens element (L2) having an aspheric surface on its second surface, and a third lens element (L3). Preferably, G1 is of negative refractive power. The ratio of $F_1/F$ in G1 can be such that $1.3 \leq |F_1/F| \leq 2.0$. In one exemplary embodiment, $F_1$ is from about −9.8 mm to about −11.5 mm.

The second lens group (G2) can include one lens element, (L4). In this embodiment, G2 is of positive refractive power. The ratio of $F_2/F$ in G2 can be such that $|F_2/F| \geq 4.0$. In one exemplary embodiment, $F_2$ is from about 27.5 mm to about 31 mm.

In this exemplary embodiment, the aperture stop lies between the second lens group (G2) and the third lens group (G3). The third lens group (G3) can include multiple lens elements, e.g., (L5) to (L8) inclusive. Preferably, G3 is of positive refractive power. The ratio of $F_3/F$ in G3 can be such that $3.8 \leq |F_3/F| \leq 5.0$. In one exemplary embodiment, $F_3$ is from about 26.8 mm to about 30.3 mm.

In this exemplary embodiment, the effective focal length of the entire lens is from about 6.4 mm to about 6.7 mm.

In more detail for the embodiments of FIGS. 2A and 2B, the first lens group G1 comprises a plurality of lens elements. For example, a first lens element (L1), lying closest to the viewing surface or screen, can have the largest diameter of all the lenses in the three lens groups. In one exemplary embodiment, the first lens element L1 in the first lens group has a sufficiently large diameter to project an image at a large field, i.e., at a half field angle greater than 45°, preferably greater than 50°, and most preferably about 55° or greater in the direction of the viewing surface or screen, with substantially no distortion.

For the embodiments of FIGS. 2A and 2B, the effective focal length to image height ratio can be from about 0.5 to 1.0. The effective focal length to image height ratio is determined by taking the effective focal length of the entire lens and dividing this number by the image height of the system. For example, if the lens has an EFL of 6.71 mm and the imager used in the optical engine has a diagonal of 13.4 mm, then the EFL to image height ratio is 6.71/13.4=0.51.

In another exemplary embodiment, the first lens element L1 in the first lens group has a diameter greater than about 60 mm and less than about 100 mm. In yet another exemplary embodiment, the first lens element of the first lens group has a diameter of about 90 mm. Thus, when implemented in a projection device, the first lens element can provide a field of view of about 110° to about 120°.

In the embodiments of FIGS. 2A and 2B, the first lens group G1 further includes a second lens element (L2) having at least one aspheric surface. The aspheric surface of the present exemplary embodiment can help reduce distortion effects, while still providing a large field of view. In one aspect, the second lens element can be fabricated from an optical polymer having a refractive index of about 1.49 and an Abbe number of about 57.2, such as polymethyl methacrylate (PMMA). The shape of the aspheric surface can be defined by the equation below:

$$Z = \frac{cr^2}{1 + \sqrt{1 - (1+k)c^2 r^2}} + \alpha_2 r^2 + \alpha_4 r^4 + \alpha_6 r^6 + \alpha_8 r^8 + \alpha_{10} r^{10} + \alpha_{12} r^{12} + \alpha_{14} r^{14}$$ (Equation I)

where

Z is the surface sag at a distance r from the optical axis of the system c is the curvature of the lens at the optical axis in $$\frac{1}{\text{mm}}$$

r is the radial coordinate in mm k is the conic constant $\alpha_2$ is the coefficient for the second order term, $\alpha_4$ is the coefficient for the fourth order term, $\alpha_6$ is the coefficient for the sixth order term, $\alpha_8$ is the coefficient for the eighth order term, $\alpha_{10}$ is the coefficient for the tenth order term, $\alpha_{12}$ is the coefficient for the twelfth order term, and $\alpha_{14}$ is the coefficient for the fourteenth order term.

In one embodiment, the second surface of the first element of the first lens group has a radius of curvature substantially equal to the radius of curvature of the first surface of the second lens element in the first lens group.

In another embodiment, the first lens group G1 includes two meniscus shaped, nested lens elements, a first meniscus shaped element made of glass and a second meniscus shaped element made of a plastic or acrylic, with a controlled thickness on the plastic/acrylic element. A material such as PMMA can be used. The two elements are spaced apart such that the ratio of the distance between the second surface of the first element and the first surface of the second element to the overall effective focal length of the projection lens is 1/175.

In an exemplary embodiment, the second shaped element comprises an aspheric lens (e.g., a lens having at least one aspheric surface) having a substantially uniform thickness throughout. This dome-shaped design can reduce thermal problems and can provide for straightforward manufacturing.

In an alternative embodiment, the first lens group G1 can comprise two shaped elements molded together to form one integral element. For example, the first shaped element can comprise a glass element and the second shaped element can comprise an acrylic or plastic (e.g., PMMA) element molded onto or cemented to the second surface of the first shaped element.

In another alternative, the lens element 1 (L1) and lens element 2 (L2) can comprise a single element (e.g., a single glass element), with an aspheric surface formed on the first surface, second surface, or both surfaces of the single element.

In an exemplary embodiment, the lens element 3 (L3) can have spherical surfaces and can be formed from glass. It provides a long negative effective focal length and its value varies from −2.5 F to −6 F, where F is the focal length for the entire projection lens.

In another exemplary embodiment, lens element 4 (L4) is a positive lens. Preferably, L4 can be a plano-convex or meniscus lens. In another exemplary embodiment, L4's surface that faces towards L3 (see e.g. surface 6 in the Tables below) can have a small radius of curvature, such that the effective focal length of L4 is larger than 4.0 F. Furthermore, L4 can be used as a focusing element in the projection lens. For a different throw distance, a sharp image can be obtained by moving L4 along optical axis.

In one exemplary embodiment, the lens elements 5, 6, and 7 (L5, L6, and L7) are formed as a cemented triplet to help control spherical aberration and coma. In an alternative embodiment, a doublet can be used to replace the triplet. In this alternative embodiment, one or both of the doublet elements can include an aspheric surface.

In another exemplary embodiment, the third lens group G3 can be of positive refractive power and all lens elements in this lens group can have spherical surfaces.

In another exemplary embodiment, the aperture stop of the projection lens 66 is located proximate to L5 (e.g., between L4 and L5, as shown in Table 1, or between L5 and L6, as shown in Table 4).

Lenses L5-L7 can comprise the same glass material or different glass materials. Example materials suitable for these lenses include those materials listed in the Tables below and other materials, including, but not limited to, N-SF1, N-SF4, N-SK5, N-SF6, N-LAK8, N-SF16, N-PSK53, N-SF57, and N-BK7, to name a few.

By way of example, for the embodiments shown in FIGS. 2A and 2B, example lenses were modeled. Tables 1, 4, and 7 below list the surface numbers for the three example lenses, in order from the output side (with surface 1 being the surface closest to the output side of the first lens element L1), the curvature (C) near the optical axis of each surface (in 1/millimeters), the on-axis spacing (D) between the surfaces (in millimeters), and the glass or other material type is also indicated. One skilled in the art will recognize that from the glass type, it is possible to determine the index of refraction and Abbe number of the material. Surface OBJ is the object surface or the surface of the viewing surface/screen. Identified surface numbers are shown in FIGS. 2A and 2B, where surfaces 15 and 16 correspond to the window glass of the exemplary DLP imaging device and "IMA" corresponds to the image plane.

In the embodiment as listed in Table 1, the wide-angle projection lens has an effective overall focal length of about 6.47 mm, a half field angle of about 56.58° in the direction of the output side and operates at F/2.6. The back focal length (BFL) is about 5.5 mm (in air). In a preferred aspect, the BFL is less than about 1.4 times the EFL. In addition, the projection lens can have a speed of less than or equal to about F/3.1 or less, and the projection lens generates an image at a half field angle of at least about 50°. For example, a first lens group G1 such as shown in FIG. 2A can have an effective focal length of −31.3 mm; a second lens group G2 such as shown in FIG. 2A can have an effective focal length of −37.5 mm; and a third lens group G3 such as shown in FIG. 2A can have an effective focal length of 30.6 mm. This example projection lens has a total track of 123.3 mm (from L1 to L8) in this exemplary embodiment. In another embodiment, such as is shown in FIG. 2B, a first lens group G1 can have an effective focal length of −11.4 mm; a second lens group G2 can have an effective focal length of 31.0 mm; and a third lens group G3 have an effective focal length of 30.3 mm. This example projection lens has a total track of 123.3 mm in this exemplary embodiment.

For the embodiments in FIGS. 2A-2B, the second surface of the lens element 2 (L2) (e.g., denoted as surface 3 in Table 1) is aspheric, as governed by Equation I above. The wide-angle projection lens of the embodiment of FIGS. 2A-2B has a total track distance of about 123.3 mm. As one skilled in the art will appreciate, in certain applications it can be advantageous to have a short total track distance because it would result in a compact projection lens thus minimizing the space requirements of the overall optical engine.

For the following examples, Tables 1-3 correspond to a first example projection lens, Tables 4-6 correspond example projection lens, and Tables 7-9 correspond to a third example projection lens.

TABLE 1

| Surface No. | C (mm$^{-1}$) | D (mm) | Glass Type |
|---|---|---|---|
| OBJ | 0 | 755 | |
| 1 | 0.0149 | 3 | N-BK7 |
| 2 | 0.0333 | 6 | ACRYLIC |
| 3 | 0.0823 | 32.44433 | |
| 4 | 0.0163 | 3 | N-SK16 |
| 5 | 0.0602 | 30.8284 | |
| 6 | 0.0397 | 4.030861 | N-SF6 |
| 7 | 0 | 9.343294 | |
| STOP | 0 | 1.0 | |
| 9 | 0.0195 | 1.2 | N-SF4 |
| 10 | 0.0799 | 4.447884 | N-SK5 |
| 11 | −0.0966 | 1 | N-SF6 |
| 12 | −0.0384 | 15 | |
| 13 | 0.04 | 12.00451 | N-BK7 |
| 14 | −0.0143 | 3 | |
| 15 | 0 | 3 | 1.472, 62.0 |
| 16 | 0 | 0.483 | |
| IMA | 0 | | |

Tables 2 and 3 below list the general lens data and the surface data summary for the first example lens.

TABLE 2

| GENERAL LENS DATA: | |
|---|---|
| Surfaces | 17 |
| Stop | 8 |
| System Aperture | Image Space F/# = 2.6 |
| Glass Catalogs | SCHOTT MISC OHARA SCHOTT_2000 |
| Ray Aiming | Paraxial Reference, Cache On |
| X Pupil Shift | 0 |
| Y Pupil Shift | 0 |
| Z Pupil Shift | 0 |
| Apodization | Uniform, Factor = 1.00000E+000 |
| Temperature (C.) | 2.00000E+001 |
| Pressure (ATM) | 1.00000E+000 |
| Effective Focal Length | 6.468447 (in air) |
| Effective Focal Length | 6.468447 (in image space) |

TABLE 2-continued

GENERAL LENS DATA:

| | |
|---|---|
| Back Focal Length | 0.4616339 |
| Total Track | 129.7823 |
| Image Space F/# | 2.6 |
| Paraxial Working F# | 2.602087 |
| Working F/# | 2.643913 |
| Image Space NA | 0.1887066 |
| Object Space NA | 0.001589476 |
| Stop Radius | 4.92572 |
| Paraxial Image Height | 9.810052 |
| Paraxial Magnification | −0.008271678 |
| Entrance Pupil Diameter | 2.487864 |
| Entrance Pupil Position | 27.60445 |
| Exit Pupil Diameter | 26.59854 |
| Exit Pupil Position | −69.17757 |
| Field Type | Angle in degrees |
| Maximum Field | 56.58 |
| Primary Wave | 0.548 |
| Lens Units | Millimeters |
| Angular Magnification | 0.09353387 |

TABLE 3

SURFACE DATA SUMMARY:

| Surf | Type | Comment | Radius | Thickness | Glass | Diameter | Conic |
|---|---|---|---|---|---|---|---|
| OBJ | STANDARD | | Infinity | 755 | | 1116.485 | 0 |
| 1 | STANDARD | | 67.00772 | 3 | N-BK7 | 90 | 0 |
| 2 | STANDARD | | 30 | 6 | ACRYLIC | 37.76403 | 0 |
| 3 | EVENASPH | | 12.15014 | 32.44433 | | 27.88211 | −0.6627935 |
| 4 | STANDARD | | 61.33346 | 3 | N-SK16 | 34 | 0 |
| 5 | STANDARD | | 16.60462 | 30.8284 | | 26 | 0 |
| 6 | STANDARD | | 25.17034 | 4.030861 | N-SF6 | 22 | 0 |
| 7 | STANDARD | | Infinity | 9.343294 | | 22 | 0 |
| STO | STANDARD | | Infinity | 1.0 | | 0 | 0 |
| 9 | STANDARD | | 51.16039 | 1.2 | N-SF4 | 12.5 | 0 |
| 10 | STANDARD | | 12.51071 | 4.447884 | N-SK5 | 12 | 0 |
| 11 | STANDARD | | −10.35593 | 1 | N-SF6 | 12 | 0 |
| 12 | STANDARD | | −26.07301 | 15 | | 13 | 0 |
| 13 | STANDARD | | 25 | 12.00451 | N-BK7 | 36 | 0 |
| 14 | STANDARD | | −70 | 3 | | 36 | 0 |
| 15 | STANDARD | | Infinity | 3 | 1.472, 62.0 | 9.89623 | 0 |
| 16 | STANDARD | | Infinity | 0.483 | | 9.369676 | 0 |
| IMA | STANDARD | | Infinity | | | 9.243695 | 0 |

Tables 4–6 correspond to a second example projection lens.

TABLE 4

| Surface No. | C (mm$^{-1}$) | D (mm) | Glass Type |
|---|---|---|---|
| OBJ | 0 | 755 | |
| 1 | 0.0131 | 3 | N-BK7 |
| 2 | 0.0333 | 6 | ACRYLIC |
| 3 | 0.0746 | 29.83529 | |
| 4 | 0.0190 | 3 | N-BAF10 |
| 5 | 0.0774 | 22.2651 | |
| 6 | 0.0447 | 8.582311 | N-SF6 |
| 7 | −0.0062 | 7.244238 | |
| 8 (Dummy) | 0 | | |
| 9 | −0.0011 | 1.2 | N-SF6 |
| STO/10 | 0.0449 | 4.6 | N-SK16 |
| 11 | −0.1414 | 1.2 | N-SF6 |
| 12 | −0.0625 | 15 | |
| 13 | 0.04 | 12.00451 | N-BK7 |
| 14 | −0.0143 | 0.1 | |

TABLE 4-continued

| Surface No. | C (mm$^{-1}$) | D (mm) | Glass Type |
|---|---|---|---|
| 15 | 0 | 3 | 1.472, 62.0 |
| 16 | 0 | 0.483 | |
| IMA | 0 | | |

Please note that surface number 8 in Table 4 is a dummy surface and that the aperture stop is co-located with surface 10.

Tables 5 and 6 below list the general lens data and the surface data summary for the second example lens.

TABLE 5

GENERAL LENS DATA:

| | |
|---|---|
| Surfaces | 17 |
| Stop | 10 |
| System Aperture | Image Space F/# = 3 |
| Glass Catalogs | SCHOTT MISC OHARA SCHOTT_2000 |
| Ray Aiming | Paraxial Reference, Cache On |
| X Pupil Shift | 0 |
| Y Pupil Shift | 0 |
| Z Pupil Shift | 0 |
| Apodization | Uniform, Factor = 1.00000E+000 |
| Temperature (C.) | 2.00000E+001 |
| Pressure (ATM) | 1.00000E+000 |
| Effective Focal Length | 6.600015 (in air) |
| Effective Focal Length | 6.600015 (in image space) |
| Back Focal Length | 0.5524066 |
| Total Track | 117.5145 |
| Image Space F/# | 3 |
| Paraxial Working F# | 3.002891 |
| Working F/# | 3.024114 |
| Image Space NA | 0.164245 |
| Object Space NA | 0.00140599 |
| Stop Radius | 3.720277 |
| Paraxial Image Height | 9.794352 |
| Paraxial Magnification | −0.008444077 |

TABLE 5-continued

GENERAL LENS DATA:

| | |
|---|---|
| Entrance Pupil Diameter | 2.200005 |
| Entrance Pupil Position | 27.36778 |
| Exit Pupil Diameter | 19.28059 |
| Exit Pupil Position | −57.77236 |
| Field Type | Angle in degrees |
| Maximum Field | 56 |
| Primary Wave | 0.548 |
| Lens Units | Millimeters |
| Angular Magnification | 0.1141047 |

TABLE 6

SURFACE DATA SUMMARY:

| Surf | Type | Comment | Radius | Thickness | Glass | Diameter | Conic |
|---|---|---|---|---|---|---|---|
| OBJ | STANDARD | | Infinity | 755 | | 1580.363 | 0 |
| 1 | STANDARD | | 76.43678 | 3 | N-BK7 | 88 | 0 |
| 2 | STANDARD | | 30 | 6 | ACRYLIC | 59 | 0 |
| 3 | EVENASPH | | 13.39753 | 29.83529 | | 46 | −0.8724296 |
| 4 | STANDARD | | 52.61928 | 3 | N-BAF10 | 31 | 0 |
| 5 | STANDARD | | 12.91721 | 22.2651 | | 24 | 0 |
| 6 | STANDARD | | 22.39428 | 8.582311 | N-SF6 | 22 | 0 |
| 7 | STANDARD | | −160.9595 | 0 | | 22 | 0 |
| 8 | STANDARD | | Infinity | 7.244238 | | 0 | 0 |
| 9 | STANDARD | | −899.3512 | 1.2 | N-SF6 | 12 | 0 |
| STO | STANDARD | | 22.28334 | 4.6 | N-SK16 | 10.5 | 0 |
| 11 | STANDARD | | −7.069801 | 1.2 | N-SF6 | 10.5 | 0 |
| 12 | STANDARD | | −16.00767 | 15 | | 12 | 0 |
| 13 | STANDARD | | 25 | 12.00451 | N-BK7 | 36 | 0 |
| 14 | STANDARD | | −70 | 0.1 | | 36 | 0 |
| 15 | STANDARD | | Infinity | 3 | 1.472, 62.0 | 13.58104 | 0 |
| 16 | STANDARD | | Infinity | 0.483 | | 13.39876 | 0 |
| IMA | STANDARD | | Infinity | | | 13.35556 | 0 |

Tables 7-9 correspond to a third example projection lens.

TABLE 7

| Surface No. | C (mm$^{-1}$) | D (mm) | Glass Type |
|---|---|---|---|
| OBJ | 0 | 755 | |
| 1 | 0.0119 | 3 | N-BK7 |
| 2 | 0.0333 | 6 | ACRYLIC |
| 3 | 0.0730 | 32.6153 | |
| 4 | 0.0129 | 3 | N-SK16 |
| 5 | 0.0720 | 22.35666 | |
| 6 | 0.0434 | 9.493437 | N-SF6 |
| 7 | −0.0015 | 6.794976 | |
| STO | 0 | 1.0 | |
| 9 | −0.0072 | 1.2 | N-SF1 |
| 10 | 0.0472 | 4.6 | N-SK16 |
| 11 | −0.1380 | 1.2 | N-SF6 |
| 12 | −0.0622 | 15 | |
| 13 | 0.04 | 12.00451 | N-BK7 |
| 14 | −0.0143 | 3 | |
| 15 | 0 | 3 | 1.472, 62.0 |
| 16 | 0 | 0.483 | |
| IMA | 0 | | |

Tables 8 and 9 below list the general lens data and the surface data summary for the third example lens.

TABLE 8

GENERAL LENS DATA:

| | |
|---|---|
| Surfaces | 17 |
| Stop | 8 |
| System Aperture | Image Space F/# = 3 |
| Glass Catalogs | SCHOTT MISC OHARA SCHOTT_2000 |
| Ray Aiming | Paraxial Reference, Cache On |
| X Pupil Shift | 0 |
| Y Pupil Shift | 0 |
| Z Pupil Shift | 0 |
| Apodization | Uniform, Factor = 1.00000E+000 |
| Temperature (C.) | 2.00000E+001 |
| Pressure (ATM) | 1.00000E+000 |
| Effective Focal Length | 6.600098 (in air) |

TABLE 8-continued

GENERAL LENS DATA:

| | |
|---|---|
| Effective Focal Length | 6.600098 (in image space) |
| Back Focal Length | 0.4419799 |
| Total Track | 124.7479 |
| Image Space F/# | 3 |
| Paraxial Working F# | 3.002246 |
| Working F/# | 3.04586 |
| Image Space NA | 0.1642793 |
| Object Space NA | 0.001405376 |
| Stop Radius | 3.97923 |
| Paraxial Image Height | 9.792374 |
| Paraxial Magnification | −0.008438577 |
| Entrance Pupil Diameter | 2.200033 |
| Entrance Pupil Position | 27.71955 |
| Exit Pupil Diameter | 24.79572 |
| Exit Pupil Position | −74.42818 |
| Field Type | Angle in degrees |
| Maximum Field | 56 |
| Primary Wave | 0.548 |
| Lens Units | Millimeters |
| Angular Magnification | 0.08872631 |

TABLE 9

SURFACE DATA SUMMARY:

| Surf | Type | Comment | Radius | Thickness | Glass | Diameter | Conic |
|---|---|---|---|---|---|---|---|
| OBJ | STANDARD | | Infinity | 755 | | 1580.945 | 0 |
| 1 | STANDARD | | 83.68771 | 3 | N-BK7 | 88 | 0 |
| 2 | STANDARD | | 30 | 6 | ACRYLIC | 59 | 0 |
| 3 | EVENASPH | | 13.69548 | 32.6153 | | 46 | −0.8942559 |
| 4 | STANDARD | | 77.23397 | 3 | N-SK16 | 31 | 0 |
| 5 | STANDARD | | 13.89109 | 22.35666 | | 24 | 0 |
| 6 | STANDARD | | 23.0284 | 9.493437 | N-SF6 | 22 | 0 |
| 7 | STANDARD | | −676.6521 | 6.794976 | | 22 | 0 |
| STO | STANDARD | | Infinity | 1.0 | | 0 | 0 |
| 9 | STANDARD | | −138.0564 | 1.2 | N-SF1 | 12 | 0 |
| 10 | STANDARD | | 21.19504 | 4.6 | N-SK16 | 10.5 | 0 |
| 11 | STANDARD | | −7.244446 | 1.2 | N-SF6 | 10.5 | 0 |
| 12 | STANDARD | | −16.08746 | 15 | | 12 | 0 |
| 13 | STANDARD | | 25 | 12.00451 | N-BK7 | 36 | 0 |
| 14 | STANDARD | | −70 | 3 | | 36 | 0 |
| 15 | STANDARD | | Infinity | 3 | 1.472, 62.0 | 13.87837 | 0 |
| 16 | STANDARD | | Infinity | 0.483 | | 13.54066 | 0 |
| IMA | STANDARD | | Infinity | | | 13.46008 | 0 |

The data provided in the Tables above represent only a few examples and are not intended to limit the scope of the invention described herein.

The optical engine described above can be utilized in the portable projection systems shown in FIGS. 3A, 3B, 3C, 4, and 5. Due to the large field of view of the optical engine described herein, unit 100, 100', 100" can provide a large image size at a short throw distance. For example, in one exemplary embodiment, the ratio of the distance from the viewing surface/screen to the image size (diagonal, 4×3 format) can be about 1.8-2.2 to 1 (as compared to a conventional digital projector, which has a ratio of the distance from the viewing screen to the image size (diagonal, 4×3 format) of about 0.7-0.9 to 1).

For example, for an image size of about 40 inches (diagonal, 4×3 format), the portable projection system 100, 100', 100", can be placed at a distance from the surface/screen of about 18-22 inches. For a 60 inch (diagonal, 4×3 format) image size, the optical engine is placed at a distance from the screen of about 27-33 inches. Of course, the exemplary optical engine described herein can provide an image size of greater than 60 inches (diagonal, 4×3 format), if necessary, using a relatively short throw distance at an extreme off-axis position. In a preferred embodiment, the image size is at least about 25-30 inches.

In exemplary embodiments, the throw ratios for an exemplary projection lens such as is described above, having an effective focal length of from about 6.41 to about 6.51 and utilizing an exemplary imager, such as a 0.53" 480p imager, are described in Table 10 below:

TABLE 10

| Distance from lens to viewing surface | Magnification | Image Size (diagonal) |
|---|---|---|
| 500 mm | 82.2 | 43.6" |
| 750 mm | 120.1 | 63.7" |
| 1000 mm | 158.2 | 83.8" |
| 1250 mm | 103.9 | 103.9" |

In addition, the optical engine is designed so that little or no keystone correction is necessary, while distortion is reduced. For example, distortion values for the projected image can be less than or equal to 2%, preferably less than or equal to 1.0%, and more preferably less than or equal to 0.5% (e.g., where distortion (d) can be determined by: d=(H−h)/h*100, where h is the paraxial image height and H is actual image height). In one exemplary embodiment, the optical engine can provide an image having a 4×3 format. In another exemplary embodiment, the optical engine can be implemented with a suitable imager to provide a different screen format, such as a 16×9 format.

Alternatively, the optical engine can be implemented with correction circuitry (e.g., a conventional warp chip), which can result in sufficient image quality at even shorter throw distances.

The portable projector system described above is designed to provide large image sizes from short distances and at extreme off-axis positions. In addition, the optical engine described herein is substantially distortion free and requires little to no keystone correction.

Those skilled in the art will appreciate that the present invention may be used with a variety of different optical components. While the present invention has been described with a reference to exemplary preferred embodiments, the invention may be embodied in other specific forms without departing from the scope of the invention. Accordingly, it should be understood that the embodiments described and illustrated herein are only exemplary and should not be considered as limiting the scope of the present invention. Other variations and modifications may be made in accordance with the scope of the present invention.

What is claimed is:

1. A portable projection system, comprising
   a housing;
   a handle coupled to the housing; and
   an optical engine, wherein the optical engine includes an illumination system; an imaging system; and a wide-angle projection lens comprising the following components in sequential order from an image side:
       a first lens group of negative refractive power, the first lens group having at least one aspheric surface;
       a second lens group;
       a third lens group of positive refractive power; and
       wherein the following Conditions (1) to (4) are satisfied:

$|F_1/F| \geq 4.5$      Condition (1)

$2.5 \leq |F_2/F| \leq 6.0$      Condition (2)

$3.8 \leq |F_3/F| \leq 5.0$  Condition (3)

$0.8 \leq BFL/F \leq 1.4$  Condition (4)

where
- F is the focal length of the wide-angle projection lens;
- $F_1$ is the focal length of the first lens group;
- $F_2$ is the focal length of the second lens group;
- $F_3$ is the focal length of the third lens group; and
- BFL is the back focal length.

2. The portable projection system of claim 1, wherein the wide-angle projection lens has an effective focal length to image height ratio of about 0.5 to about 1.0.

3. The portable projection system of claim 1, wherein the third lens group comprises an aperture stop for the wide-angle projection lens, a first lens element and a second lens element, wherein the second lens element has an effective focal length of from about 30 mm to about 40 mm.

4. The portable projection system of claim 3, wherein the second lens element comprises a surface facing the aperture stop and a surface facing away from the aperture stop, wherein the curvature of the surface facing the aperture stop is greater than the curvature of the surface facing away from the aperture stop.

5. The portable projection system of claim 3, wherein the second lens element is a single structure lens element.

6. The portable projection system of claim 5, wherein the single structure lens element is one of a bi-convex lens and a plano-convex lens.

7. The portable projection system of claim 1, wherein the first lens group has an oblong shape and a rectangular aperture.

8. The portable projection system of claim 1, further comprising a video gaming system disposed in the housing and a gaming card/disc/cartridge receptacle coupled to the video gaming system.

9. The portable projection system of claim 8, wherein the video gaming system produces an image that is projected by the wide angle lens onto a viewing surface, the projected image having a size of at least about 40 inches (diagonal) when the portable projection system is about 0.5 meters from the viewing surface.

10. The portable projection system of claim 1, wherein the handle comprises an adjustable handle.

11. The portable projection system of claim 1, further comprising a docking port configured to receive a digital image player.

12. A portable projection system, comprising:
- a housing;
- a handle coupled to the housing; and
- an optical engine, wherein the optical engine includes an illumination system; an imaging system; and a wide-angle projection lens comprising the following components in sequential order from an image side:
  - a first lens group of negative refractive power, the first lens group having at least one aspheric surface;
  - a second lens group;
  - a third lens group of positive refractive power; and wherein the following Conditions (1) to (4) are satisfied:

$1.3 \leq |F_1/F| \leq 2.0$  Condition (1)

$|F_2/F| \geq 4.0$  Condition (2)

$3.8 \leq |F_3/F| \leq 5.0$  Condition (3)

$0.8 \leq BFL/F \leq 1.4$  Condition (4)

where
- F is the focal length of the wide-angle projection lens;
- $F_1$ is the focal length of the first lens group;
- $F_2$ is the focal length of the second lens group;
- $F_3$ is the focal length of the third lens group;
- BFL is the back focal length.

13. The portable projection system of claim 12, wherein the effective focal length to image height ratio is from about 0.5 to about 1.0.

14. The portable projection system of claim 12, wherein the third lens group comprises an aperture stop for the wide-angle projection lens, a first lens element and a second lens element, wherein the second lens element has an effective focal length of from about 30 mm to about 40 mm.

15. The portable projection system of claim 14, wherein the second lens element is a single structure lens element.

16. The portable projection system of claim 12, wherein the second lens element comprises a surface facing the aperture stop and a surface facing away from the aperture stop, wherein the curvature of the surface facing the aperture stop is greater than the curvature of the surface facing away from the aperture stop.

17. The portable projection system of claim 12, further comprising a video gaming system disposed in the housing and a gaming card/disc/cartridge receptacle coupled to the video gaming system.

18. The portable projection system of claim 17, wherein the video gaming system generates an image that is projected by the wide angle lens onto a viewing surface, the projected image having a size of at least about 40 inches (diagonal) when the portable projection system is about 0.5 meters from the viewing surface.

19. The portable projection system of claim 12, wherein the handle comprises an adjustable handle.

20. The portable projection system of claim 12, further comprising a docking port configured to receive a digital image player.

21. A portable projection system that includes an optical engine comprising:
(a) an illumination system;
(b) an imaging system; and
(c) a projection lens having a back focal length of less than about 1.4 times the effective focal length and a speed of less than or equal to about F/3.1 or less, and wherein the projection lens generates an image at a half field angle of at least about 50° that has substantially no distortion.

* * * * *